June 10, 1941.                N. MULLER                2,244,917
                    DANDELION AND WEED ERADICATOR
                         Filed June 12, 1939
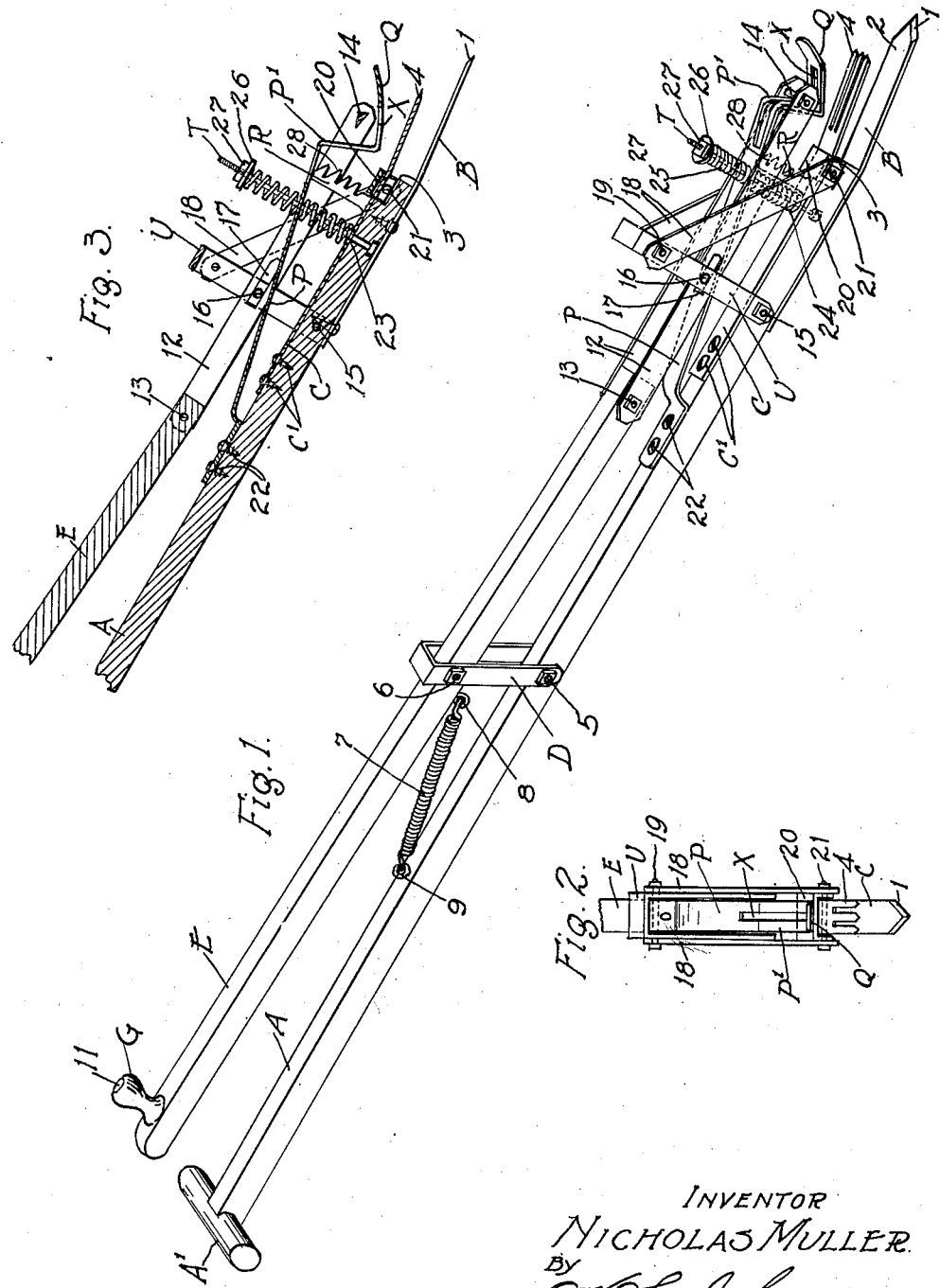
INVENTOR
NICHOLAS MULLER.
By
His ATTORNEY.

Patented June 10, 1941

2,244,917

UNITED STATES PATENT OFFICE 2,244,917

DANDELION AND WEED ERADICATOR

Nicholas Muller, St. Paul, Minn.

Application June 12, 1939, Serial No. 278,611

2 Claims. (Cl. 7—14.4)

My invention has for its object a means to provide a simple and efficient device for digging weeds—such as dandelions, etc. and spearing the heads thereof, and the same consists of the novel device and the combination of devices hereinafter defined and described.

My invention likewise consists of improvements in lawn tools in the nature of a weeder, employing among other characteristics a cutting element and a spearing element which rigidly holds the cut head of the dandelion or other weed and a lifting element removing the speared decapitated head of the dandelion or weed from its retained position upon the spear.

The invention furthermore relates to garden tools whose object it is to provide a weeder comprising a cutting and spearing head and which, after severing the root, clamps the head of the severed weed in locked position upon the spear and then lifts the same from out of its growing hole.

A further object of the invention is to provide an above surface means of retaining a severed head of the root and lifting the same from without its growing hole and ejecting the same.

My invention has as a further object the provision of a simple and efficient device for digging and picking up weeds that grow in lawns without the necessity of leaving digging holes.

A further object of my invention is to provide an underground severing means for the root, an above ground means for the spearing of the severed head and the firm retention of the head, a manually controlled lifting means by which the stem of the severed root may be extracted from its growing hole and upon the withdrawal of the root severing means, the severed head may be ejected from its lodged position upon the garden tool or weeder.

The invention furthermore consists in the novel combination and arrangement of parts as will be hereinafter more fully described and particularly pointed out. The improved device is illustrated in the accompanying drawing where like characters indicate like parts throughout the several views and in which, Figure 1 is a perspective view of my invention showing all the component parts ready for operation.

Figure 2 is a partial front view of the operative cutter and lifting portion of my invention, and Figure 3 is a longitudinal section taken through the middle of the operative cutter and lifting portion.

Referring to the drawing, A represents a cutter supporting handle which is provided at its upper end with a cross push bar A1 and a cutting blade B made fast at the lower extremity of the handle. The cutting blade B is provided with an inclined V-shaped cutting edge f which may be reversed or indented.

The handle A is provided with a cut out portion 3 at its lower extremity, the purpose of which will hereafter be more fully described. Atop the handle A a forked spring blade C is made fast by holding means C1. The spring blade C is provided with tines 4 at one end and at the other end the spring blade C is yieldingly held atop the handle A by the blade fastenings C1. The flexibility of the spring blade C with the tines 4 at one end thereof permits the end with the tines 4 to be lifted, and when the applied lifting power is released, the blade C through its own spring action resumes its normal working position.

At a predetermined point along the length of the handle A there is provided a U clevis D made rockably fast about a pivotal or rocking pin 5 for suspending a lifting and ejecting handle E rockable upon a pivotal pin 6 so as to permit the free tilting back of said handle E to a normal operative position by the tension of a coil spring 7 connected to the underside of the lifting and ejecting control handle E by means of the eyelet 8 and made fast to an eyelet 9 positioned upon the upper surface of the handle A. The lifting and ejecting control handle E is further provided with an operating grip G made fast atop the upper portion of the handle by holding means 11.

Near the lower termination of the lifting and ejecting handle E are provided two operative rocking extension arms 12 pivotally mounted upon the pivot pin fastening means 13 and held apart by a toothed spacer 14.

The handle A near its lower extremity is provided with a rockable clevis U for suspending rocking extension arms 12 at predetermined heights through a spacer sustaining means 16 made fast upon the two sides of the clevis U. The spacer sustaining means 16 travels within guide slots 17 provided at predetermined points in the rocker extension arms 12.

Near the upper portion of the clevis U are provided ejecting arms 18 made rockably fast upon a pivotal fastening means 19. The lower end of the ejecting arms 18 are held spaced apart by an inverted U shaped spreader or ejector 20 positioned atop the head spearing forked spring blade C and positioned thereon by the locking bolt means 21 which contacts the under portion of the free head part of the spearing forked spring blade C and which ejector means is permitted to rest in inoperative position within the cut out portion 3 at the lower extremity of the handle A.

Positioned between the rocking ejecting arms 18 is a spring sustained clamping member P which is connected to the handle A by the holding means 22. The lower or severed weed head holding portion of the clamping member P is provided with an offset hand P1 and a locking palm Q which, when lowered upon the speared dandelion head or weed head resting upon the tines 4, will rigidly clamp the same in locked position until ejected.

The hand P1 and palm Q are provided with a slot X so as to permit the hand P1 and the palm Q to be lowered over the locking and holding ratchet R which cooperates with the slidably positioned spacer 14 to lock and so to sustain the speared weed head between the palm Q and fork 4. Atop the handle A near its lower extremity there is provided a swivel bolt T swivelly positioned within the lower part of the handle A and extending up through a slot 23 made at a predetermined point in the head spearing forked spring blade C behind the spreader and ejector member 20. The swivel bolt T acts as a sustainer for spiral spring 24 positioned between the head spearing fork member C and the clamping member P. Atop the clamping member P there is provided a positioning and realigning coil spring 25 the tension of which is maintained by the locking washer 26 held in adjustment by the adjustable nut 27 upon the swivel bolt T.

Imposed above the head spearing forked spring blade C on the handle A is a ratchet R whose locking members or teeth 28 cooperating with said spacer 14 are for the locking and clamping of the weed head between the spear tines 4 and the palm Q during its head lifting operation. In operation, the springs 7, 24, and 25 act in unison to retain the several component parts in a normal operative position.

Assuming that the user desires to eradicate a dandelion or a weed from the lawn, he places the cutting blade 1 in line with the root and with a slight push upon the push bar A1, the blade B will be forced beneath the surface of the soil and cut the root, simultaneously the tines 4 of the yieldable spring blade C will spear the severed head and hold the same. A pressure upon the handle E, as the cutting action of a pair of scissors, will rock the lifting and ejecting handle E about the pivotal pin 6 so that the lower extremity of the lifting handle E will be drawn outward away from the handle A. The rocking extensions 12 supported by the spacers 16 in the member U will force the lower ends of the rocking extensions 12 and the locking spacer 14 down upon the clamping member P so as to press the palm Q of the clamping member P upon the severed head of the dandelion or weed and a slight pull upon the handle G, made fast atop the lifting and ejecting handle, will lock the locking toothed spacer 14 into a toothed space on the aligned ratchet R, locking the decapitated head upon the tines 4 for its removal.

A pull outward upon the handle E, as the opening of a pair of scissors, will, because of its link connections 13 and its pivotal connections 6 and 16, lift the locking spacer 14 and its locked aligned ratchet R so as to likewise lift the sustained head spearing forked spring blade C to such height as to remove the speared decapitated head. The implement may then be withdrawn from the ground leaving naught but a chisel mark where the blade B entered the ground and the weed hole.

The speared head of the decapitated weed is retained upon the head spearing fork tines 4, clamped thereon by the palm Q of the clamping member P. A sudden push forward upon the handle G made fast atop the lifting and ejecting arm E, will push its associated ejecting members and the U shaped spreader and ejector 20 with its locking bolt 21 along the forked spring blade C and tines 4 and release the speared decapitated head from the spear. The ejection of the speared weed head from the fork tines 4 will at the same time release the locking spacer 14 from its aligned ratchet R while the counter action of the several springs 24, 25 and 7 will realign all component parts for renewed operation.

I claim:

1. A device of the class described comprising a handle, a cutting blade attached to the under side of said handle and extending longitudinally therefrom, a yieldable spearing fork fixed to the upper side of said handle directly above and substantially parallel to said cutting blade, and a manually operated weed head clamping and locking means on said handle cooperating with said fork to engage and retain the speared and severed weed head therebetween.

2. The device of claim 1, and an ejector slidably mounted on said fork and means for manually operating said ejector.

NICHOLAS MULLER.